UNITED STATES PATENT OFFICE.

BENEDICT G. DU RETTE, OF KOSCIUSKO, MISSISSIPPI.

IMPROVEMENT IN MEDICAL COMPOUNDS.

Specification forming part of Letters Patent No. 216,317, dated June 10, 1879; application filed April 8, 1879.

*To all whom it may concern:*

Be it known that I, BENEDICT G. DU RETTE, of Kosciusko, in the county of Attala and State of Mississippi, have invented certain new and useful Improvements in Medical Compounds; and I do hereby declare that the following is a full, clear, and exact description of the invention, which will enable others skilled in the art to which it appertains to make and use the same.

This invention relates to certain improvements in medical compounds, forming a purgative and an anti-periodic; and to these ends it consists in the compounding certain ingredients known as "barberry-bark," "poplar-bark," and "Oregon grape-root," which may be prepared as a powder, or in the form of a solution or liquid, substantially as hereinafter more fully set forth.

In preparing my compound I take barberry-bark, in the proportion of one-half ($\frac{1}{2}$) to one-fourth ($\frac{1}{4}$) each of Oregon grape-root and poplar-bark, and compound the same either in the form of a powder or as a solution or liquid. In the preparation of the compound in the latter form, a quantity of alcohol is added thereto sufficient to form the powder into a solution. This mixture is permitted to percolate, say, five days, more or less, according to the quantity to be filtrated, after which the filtered mixture is bottled up ready for use or sale.

I shall, however, put up the compound in a powdered form in two-ounce packages, though it may be put up in the form of a liquid or solution in bottles.

This compound serves both as a purgative and an anti-periodic, enhancing its value twofold.

In producing the compound in a liquid form, I propose to extract the essence of barberry-bark separately; then extract the essence of each ingredient separately. Or, another way is to extract the joint essence of all the ingredients at once.

This is taken thirty (30) drops to a dose for an adult.

The powder is administered in doses of half a wine-glass.

Having thus fully described my invention, I claim and desire to secure by Letters Patent—

The herein-described medical compound, compounded of barberry-bark, Oregon grape-root, and poplar-bark, in the proportions specified.

In testimony that I claim the foregoing as my own I affix my signature in presence of two witnesses.

BENEDICT GEORGE DU RETTE.

Witnesses:
THOMAS O'CONNER CONNER,
DAVID CRUMBLY WASSON.